: US009456544B2

(12) United States Patent
Wehler et al.

(10) Patent No.: US 9,456,544 B2
(45) Date of Patent: *Oct. 4, 2016

(54) PRECISION SUPER SEEDER

(71) Applicant: Blount, Inc., Portland, OR (US)

(72) Inventors: Todd M. Wehler, Mt. Morris, IL (US); Cory E. Sarver, Dixon, IL (US)

(73) Assignee: Blount, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,072

(22) Filed: Jun. 23, 2015

(65) Prior Publication Data

US 2015/0289440 A1  Oct. 15, 2015

Related U.S. Application Data

(62) Division of application No. 13/838,004, filed on Mar. 15, 2013.

(51) Int. Cl.

| A01B 49/06 | (2006.01) |
| A01C 7/18 | (2006.01) |
| A01C 7/20 | (2006.01) |
| A01C 7/00 | (2006.01) |

(52) U.S. Cl.
CPC ............... *A01C 7/008* (2013.01); *A01B 49/06* (2013.01); *A01C 7/002* (2013.01); *A01C 7/18* (2013.01); *A01C 7/208* (2013.01)

(58) Field of Classification Search
CPC ...... A01B 49/06; A01B 49/04; A01B 49/00; A01C 7/18; A01C 7/00; A01C 7/208; A01C 7/20; A01C 7/008; A01C 7/002
See application file for complete search history.

(56) References Cited

U.S. PATENT DOCUMENTS

| 2,221,769 | A | | 11/1940 | Nipple | |
| 2,811,089 | A | | 10/1957 | Blackstone | |
| 3,153,456 | A | | 10/1964 | Noble | |
| 2004/0079264 | A1 | * | 4/2004 | Mayerle | A01C 7/20 111/174 |
| 2005/0235890 | A1 | * | 10/2005 | Mariman | A01C 7/081 111/174 |
| 2006/0260523 | A1 | * | 11/2006 | Claydon | A01B 49/06 111/170 |

FOREIGN PATENT DOCUMENTS

JP             06276813 A  * 10/1994  ............... A01C 5/06

* cited by examiner

*Primary Examiner* — Christopher J Novosad
(74) *Attorney, Agent, or Firm* — Schwabe Williamson & Wyatt, P.C.

(57) ABSTRACT

In embodiments, a seeder may include a frame including a seed box and a rear roller. In embodiments, the seeder may be configured to removably couple with either a roller assembly or a disc blade assembly. In some embodiments, the seeder may include a front tray configured to receive two kinds of seed from two different seed boxes and disperse the seed at a position in front of the rear roller so that the seeds are planted at the same depth. In some embodiments, the seeder may further include a calibration tray which may have a width less than a width of the seeder. The calibration tray may be configured to receive seed from the seed box during a calibration procedure.

12 Claims, 8 Drawing Sheets

PRECISION SUPER SEEDER

CROSS-REFERENCE TO RELATED APPLICATIONS

The present application is a divisional application of and claims priority to U.S. patent application Ser. No. 13/838,004, filed Mar. 15, 2013, entitled "Precision Super Seeder," the disclosure of which is hereby incorporated by reference in its entirety for all purposes except for those sections, if any, that are inconsistent with this specification.

FIELD

Embodiments relate to a seeder configured to condition and seed ground using a variety of seeds and different tools.

BACKGROUND

Seeders may be used in a variety of agricultural applications. For example, some seeders may be pulled behind a device such as a tractor and include one or more tools designed to plow through or otherwise disturb turf as it passes over it. Other seeders may have one or more mechanisms to distribute seeds over the ground.

BRIEF DESCRIPTION OF THE DRAWINGS

Features and advantages of the present disclosure will become apparent from the following detailed description of embodiments herein disclosed by way of example with reference to the attached drawings.

FIG. 5-A is a top view of a seeder with the roller assembly, wherein the rollers are substantially straight, in accordance with various embodiments.

FIG. 5-B is a top view of a seeder with the roller assembly, wherein the rollers are angled, in accordance with various embodiments.

FIG. 6-A is a top view of a seeder with the disc blade assembly, wherein the disc blades are substantially straight, in accordance with various embodiments.

FIG. 6-B is a top view of a seeder with the disc blade assembly, wherein the disc blades are angled, in accordance with various embodiments.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Moreover, it should also be understood that any temperature, weight, volume, time interval, range, other measurements, quantities and numerical expressions given herein are intended to be approximate and not exact or critical values unless expressly stated to the contrary. Where appropriate, it may be proper to describe various embodiments using approximate or relative terms and terms of degree commonly used, such as dimensioned, about, approximately, substantially, essentially, comprising, and the like.

Existing seeders have a variety of drawbacks. For example, some seeders may be configured with a roller on a front portion of the seeder. The roller may be useful for tearing up large portions of turf as it travels behind a tractor. However, in some embodiments it may be more desirable to till the turf and create specific furrows. In these embodiments, a disc blade may be preferable to the roller, and so a different seeder may be required for that application.

In other seeders, it may be desirable to calibrate the seeder; however, the calibration may be difficult to perform. For example, a calibration tray may be provided in the seeder, but the tray is not removable. Additionally, the tray may have a width close to the width of the seeder, so a substantial amount of seed may be required, and possibly wasted, to calibrate the seeder.

In other seeders, different types of seed may be kept in different seed boxes. However, in some applications it may be desirable to plant the different types of seed at different depths. In other applications it may be desirable to plant the different types of seed at the same depth.

In embodiments of the present disclosure, a seeder is provided which may interchangeably use a roller assembly or a disc blade assembly. Therefore, the operator may have the option of using either rollers or disc blades depending on the application for which the seeder is being configured. Additionally, embodiments of the present disclosure may include a removable calibration tray, thereby simplifying calibration of the seeder. In embodiments, the calibration tray may have a width less than the width of the seeder such that less seed may be necessary to accurately calibrate a seed box of the seeder. In addition, embodiments of the present disclosure may include the option to distribute two different types of seed from two different seed boxes for planting at either the same or different depths. Therefore, embodiments of the present disclosure may be operable as a turf reconditioning tool, a primary seeder, and/or a food plot and conservation seeder. Additionally, embodiments of the present disclosure may be customizable for different types of turf such that a healthy root system may be developed for the seeds distributed by the seeder. Although embodiments coupled with a roller assembly or disc blade assembly are described herein, in other embodiments the seeder may be configured to couple with an assembly using a different type of tillage or turf conditioning tool.

Figure 1:
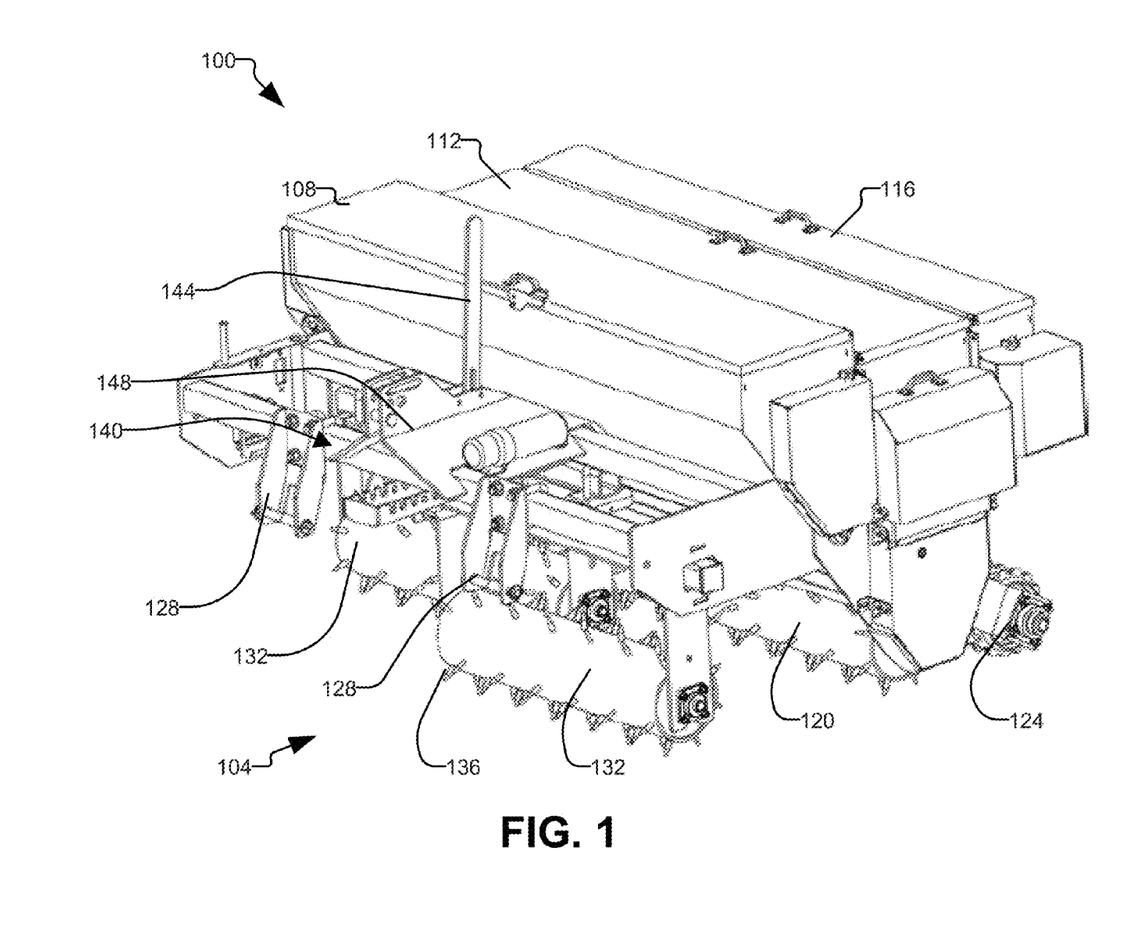
FIG. 1 is a perspective view of a seeder with a roller assembly, in accordance with various embodiments.

FIG. 1 depicts an example of a seeder 100 with a roller assembly 104 on a front portion of the seeder 100. The seeder 100 may include one or more of a native seed box 108, a primary seed box 112, and/or a legume seed box 116. In embodiments, the seeder 100 may be configured to attach to a tractor or some other powered vehicle, for example using latches 128, and be pulled behind the tractor or vehicle. The seeder 100 may have a width between approximately 60" and 100", with a working width between approximately 45" and 85". However, in other embodiments the seeder 100 may be wider or narrower.

In embodiments, the native seed box 108 may have a capacity between approximately 5 and 10 bushels (bu), though in other embodiments the native seed box 108 may have larger or smaller capacities. In embodiments, the native seed box 108 may be configured to hold and distribute long-stem prairie seed such as big blue stem, brome, indian, little blue stem, side oats grama, and/or brassica grasses. In embodiments, the primary seed box 112 may be configured to plant large seeds such as soybeans, grass seeds, or small legume seeds. Specifically, the primary seed box 112 may have a capacity between approximately 4 and 8 bu, though in other embodiments the primary seed box 112 may have larger or smaller capacities. In embodiments the primary seed box 112 may be configured to hold and distribute seed such as annual rye grass, barley, Kentucky blue grass blends, fescue, oats, orchard grass, perennial rye grass, snow peas, sorghum, soybeans, sunflower, sudan, and/or wheat. In embodiments, the legume seed box 116 may have a capacity between approximately 1 and 2 bu, though in other embodiments the legume seed box 116 may have larger or smaller capacities. In embodiments, the legume seed box 116 may be configured to hold and distribute alfalfa, bahai, bermuda, birdsfoot tree foil, brassica, buckwheat, carpet grass, centipede, chicory, clover, fescue, forbs, Kentucky blue grass, radish, rape, sudan, switch grass, timothy, and/or turnip. In some embodiments, the seeder 100 may only have one, two, or all three of the native, primary, and legume seed boxes 108, 112, and 116. Other embodiments may have additional seed boxes configured to hold additional kinds of seed, or duplicate boxes configured in the same or similar manner to boxes 108, 112, and/or 116.

In embodiments, the seeder 100 may further include a cultipacker 124 attached to a rear portion of the seeder 100. In embodiments, the cultipacker 124 may be configured to firm the seed bed by having a weight sufficient to press down on the seedbed. In embodiments, the cultipacker 124 may be desirable for use with relatively small seeds such as those that may be distributed by the primary seed box 112 or the legume seed box 116.

In embodiments, the seeder 100 may further include a rear roller 120 that may be configured to firm and press soil kicked up by a front tillage tool of the seeder 100 such as the roller assembly 104 or the disc blade assembly described below with respect to FIG. 2. In embodiments, firming the soil with the rear roller 120 may help to create a uniform seedbed with the loose soil necessary for ensuring proper seed germination. Additionally, and as discussed in greater detail below, the motion of the rear roller 120 may provide the energy used to distribute seed from one or more of the native, primary, and/or legume seed boxes 108, 112, and 116.

In embodiments, the roller assembly 104 may be coupled with one or more toolbars of the seeder 100, as shown in greater detail below in FIG. 5-A. The roller assembly 104 may include two rollers 132. In other embodiments, the roller assembly 104 may include a greater or lesser number of rollers 132. In embodiments, the rollers 132 and 120 may have a diameter of approximately 8", though greater or lesser roller diameters may be used in other embodiments. In embodiments, the rollers 132 and 120 may have spike roller pins 136 protruding from the rollers 132 and 120. In some embodiments, the spike roller pins 136 may measure approximately ½"×1¾", though in other embodiments the spike roller pins 136 may have other measurements. In some embodiments, the rollers 132 and 120 may have between approximately 256 and 448 spike roller pins 136, though in other embodiments one or both of the rollers 132 and 120 may have more or less spike roller pins 136. In some embodiments rollers 132 may have the same number of spike roller pins as roller 120, and in other embodiments rollers 132 and 120 may have different numbers of spike roller pins. In some embodiments, each of the front rollers 132 may have the same number of spike roller pins 136 as one another, or a different number of spike roller pins 136.

In some embodiments, the roller assembly 104 may further include an adjustment mechanism 140 configured to adjust the angle of the rollers 132 as described in further detail below with respect to FIGS. 5-A and 5-B. The adjustment mechanism 140 may include an adjustment lever 144 to enable an operator of the seeder 100 to adjust the roller assembly 104. In embodiments, the adjustment mechanism 140 may further include one or more mast plates 148 configured to overlay the adjustment mechanism 140 and connect the seeder 100 to a tractor (not shown).

Figure 2:
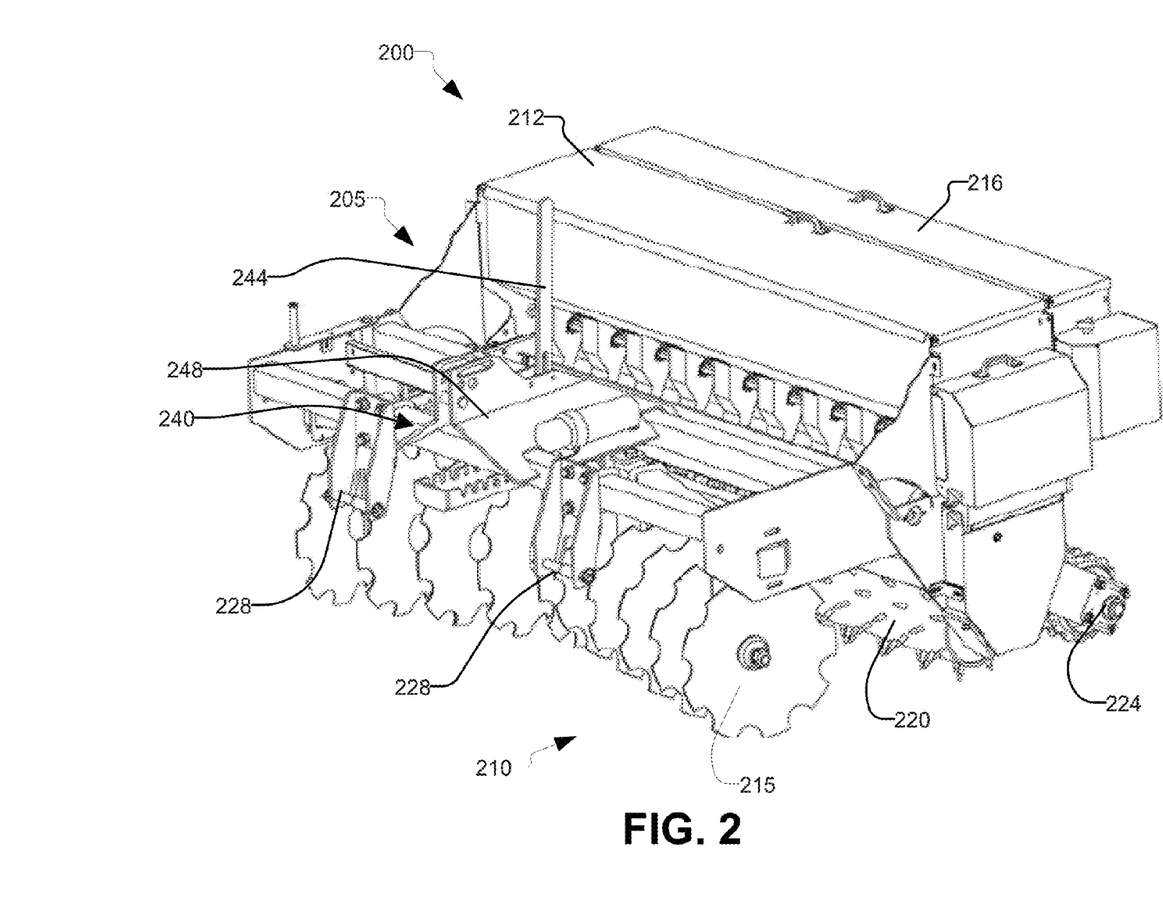
FIG. 2 is a perspective view of a seeder with a disc blade assembly, in accordance with various embodiments.

FIG. 2 depicts an alternative embodiment of a seeder 200. In FIG. 2, the native seed box is missing at 205, and instead a plurality of seed cups of the primary box are illustrated at 205. In embodiments, the seed box may have between 7 and 12 seed cups that span the width of the seeder 200. In seeder 200, the roller assembly 104 described above in FIG. 1 is replaced by a disc blade assembly 210. In embodiments, the disc blade assembly 210 is configured with a gang of disc blades 215. In embodiments, each disc blade in the gang of disc blades 215 may be a notched disc blade approximately 18" in diameter, though in other embodiments the disc blades may be smaller or larger. In some embodiments, the disc blades in the gang of disc blades 215 may be approximately 7-8" from one another, though in other embodiments the disc blades may be closer together or further apart.

In embodiments, the seeder 200 has elements similar to those of the seeder 100 shown in FIG. 1, for example rear roller 220, latches 228, adjustment mechanism 240, adjustment lever 244, mast plates 248, cultipacker 224, primary seed box 212, and legume seed box 216. In embodiments, the roller assembly 104 and the disc blade assembly 210 may be removable such that an operator of the seeder 100 or 200 has the capability to, for example, exchange the roller assembly 104 with the disc blade assembly 210, or vice versa, dependent upon the application that the seeder 100 or 200 will be used for. For example, the same seeder may be used for a tilling application when coupled with the disc blade assembly 210, as well as turf conditioning when coupled with the roller assembly 104.

Figure 3:
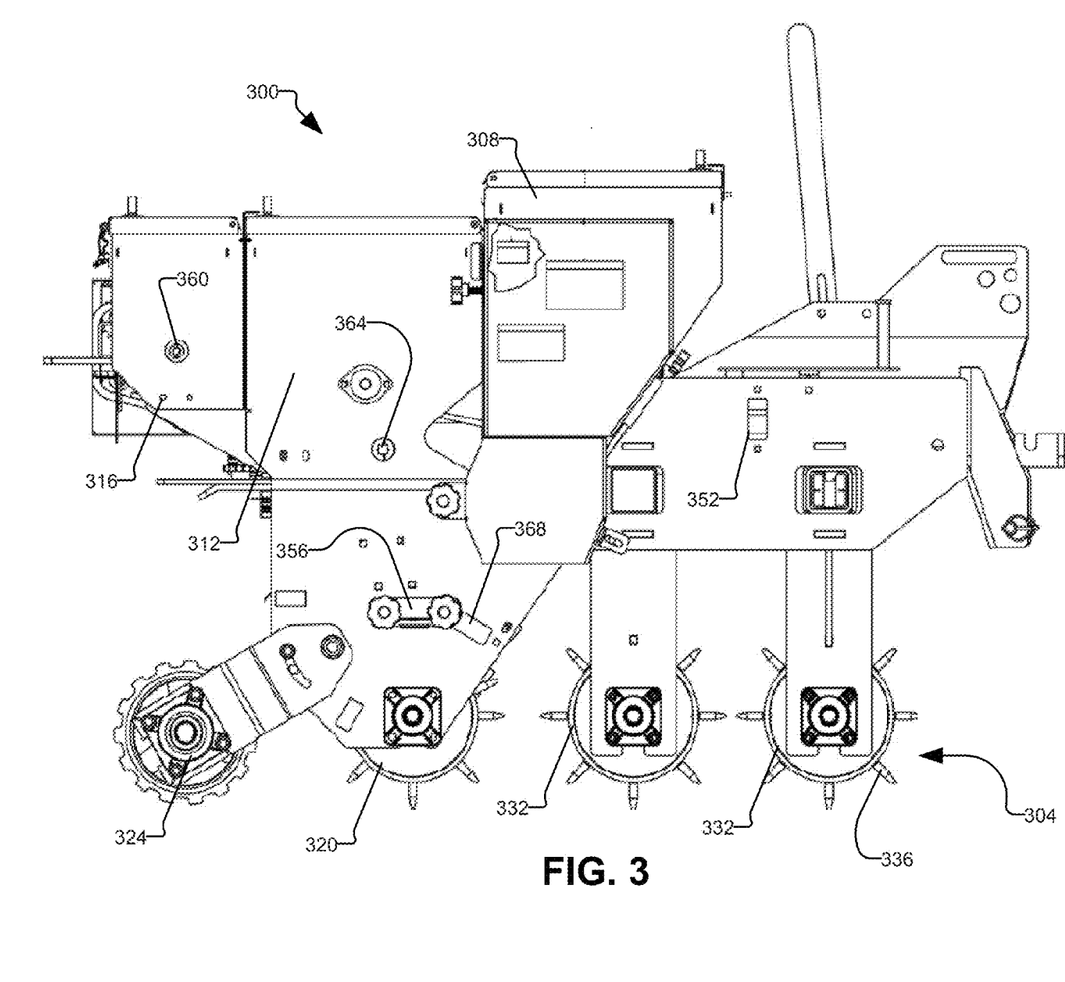
FIG. 3 is a side view of a seeder with a roller assembly, in accordance with various embodiments.

FIG. 3 is a side view of a seeder 300 with a roller assembly 304. For example, seeder 300 may include two rollers 332 with spike roller pins 336 in the roller assembly 304, as well as a rear roller 320 and a cultipacker 324. The seeder 300 may further include native, primary, and legume seed boxes 308, 312, and 316. Similarly to seeder 100, in some embodiments seeder 300 may not include the cultipacker 324. Additionally, in some embodiments the seeder 300 may only include 1, 2, or all 3 of the native, primary, and legume seed boxes 308, 312, and 316.

In embodiments, the seeder 300 may further include a removable calibration tray which may be used to calibrate the output of the primary seed box 312 or the legume seed box 316 of the seeder 300. In embodiments, the calibration tray may be stored at the storage position 352. To perform the calibration, the calibration tray may be removed from the seeder 300 and installed at the legume and primary collection slot 356. A known amount of seed, for example one or two pounds of seed, may be put in the desired seed box, e.g. the primary seed box 312 or the legume seed box 316, and the seed box may be set to a known setting. For example, the seed box may have a number of seed cups, and the seed cups may be set at the halfway position. In some embodiments, the seed may be placed directly in the seed cups.

In embodiments of the seeder 300, the calibration tray may not extend all the way across the width of the seeder 300, but instead may have a width less than that of the seeder. Therefore, if the calibration tray is inserted into the right side of the seeder 300, the seed may be placed directly into the right-most seed cups of the seeder 300. For example, in some embodiments the calibration tray may only be approximately as wide as two seed cups of the seeder 300. As noted above, for example with respect to FIG. 2, the seeder 300 may have between 7 and 12 seed cups. Therefore, the calibration tray may have a width that is between approximately 15% and 30% of the width of the seeder 300. If the seeder has a width between about 60" and 100", the calibration tray may have a width between approximately 10" and 30". In some embodiments, the calibration tray may be wider or narrower, for example having a width that is equivalent to between one and four seed cups. A calibration tray with a width less than that of the seeder 300 may reduce the amount of seed necessary to successfully perform the calibration procedure.

Dependent on which seed box is being calibrated, a seed box shaft of the seed box may be rotated. In some embodiments, the seeder 300 may include a calibration crank handle used to rotate the seed box shaft, while in other embodiments the seed box shaft may be rotated using a socket wrench or some other way of turning the seed box shaft. For example, if the legume seed box 316 is being calibrated, the legume seed box shaft 360 may be rotated. If the primary seed box 312 is being calibrated, the primary seed box shaft 364 may be rotated. Rotation of the seed box shaft may cycle seed through the seed box, and deposit the seed on the calibration tray in the legume and primary collection slot 356.

The amount of the seed on the calibration tray may then be used to determine the rate at which seed is being deposited by the seeder 300, and the operator may use that information to determine whether to adjust the flow rate of the seed box. For example, the gearing of the seed box shafts 360 or 364 may be known, and so it may be easy to determine how many rotations of the seed box shafts 360 or 364 are necessary to simulate travel of the seeder 300 over a given area. That information may then be extrapolated from the small simulated area to a larger area. In embodiments, the primary or legume seed boxes 312 or 316 may have levers, knobs, dials, or some other method of adjusting the output flow rate of the seed box. If the amount of seed being output is determined by the calibration procedure to be too great, then the amount of output seed may be reduced. By contrast, if the amount of seed being output is determined by the calibration procedure to be too little, then the amount of output seed may be increased.

Although only the primary and legume seed boxes 312 or 316 are discussed, in some embodiments the native seed box 308 may be likewise calibrated, for example by installing the calibration tray at the native collection slot 368. Additionally, in some embodiments the calibration procedure may be performed by using a tractor to move the seeder 300 over a known distance instead of manually rotating the seed box shafts 360 or 364.

Figure 4:
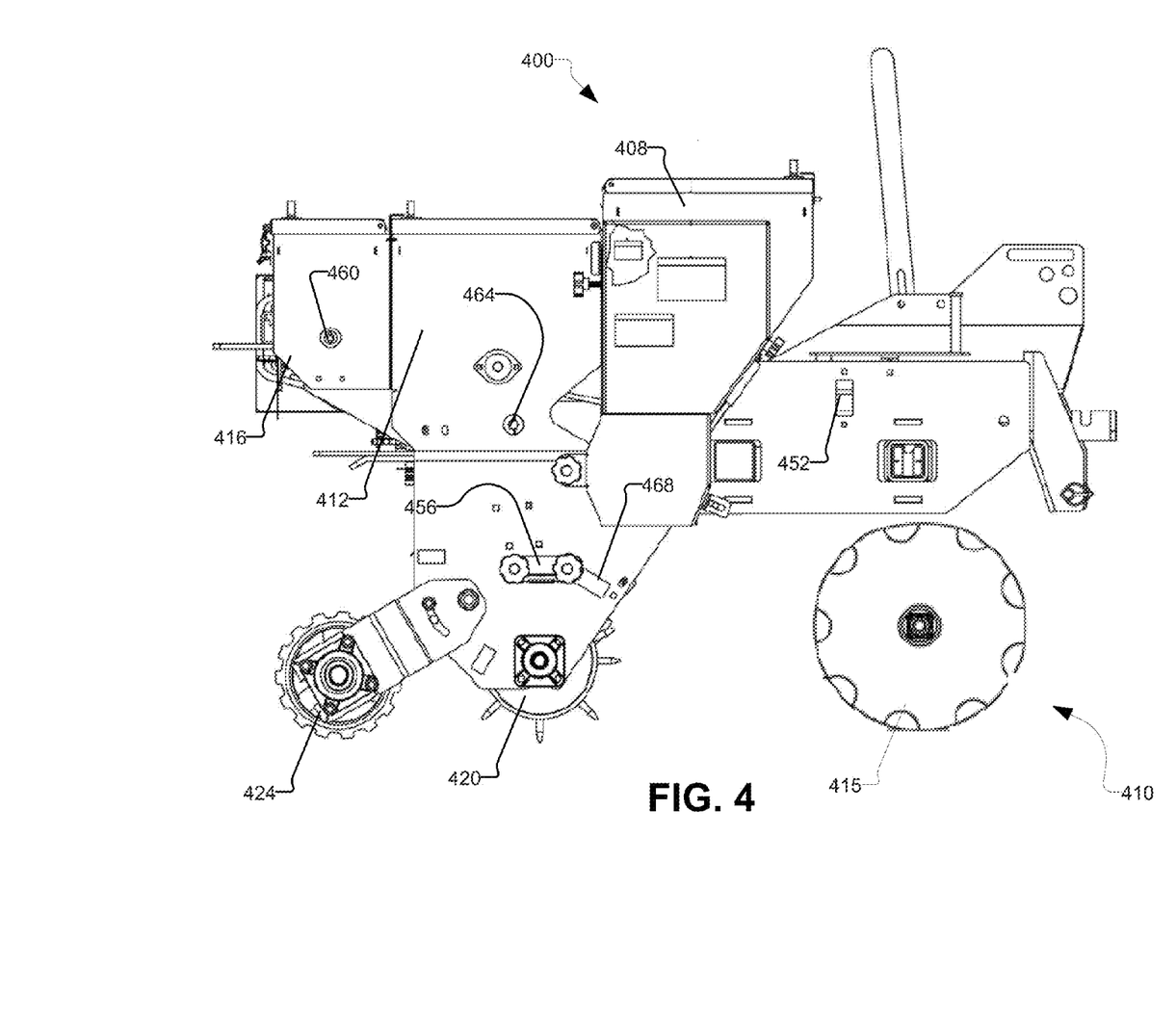
FIG. 4 is a side view of a seeder with a disc blade assembly, in accordance with various embodiments.

FIG. 4 depicts a side view of a seeder 400 coupled with the disc blade assembly 410 and a gang of disc blades 415. It can be seen that the seeder 400 may further include elements of seeders 100, 200, or 300, including for example the native, primary and legume seed boxes 408, 412, and 416, a rear roller 420, a cultipacker 424, legume and primary seed box shafts 460 and 464, a native collection slot 468, a calibration tray storage position 452, and a legume and primary collection slot 456.

Figure 5:
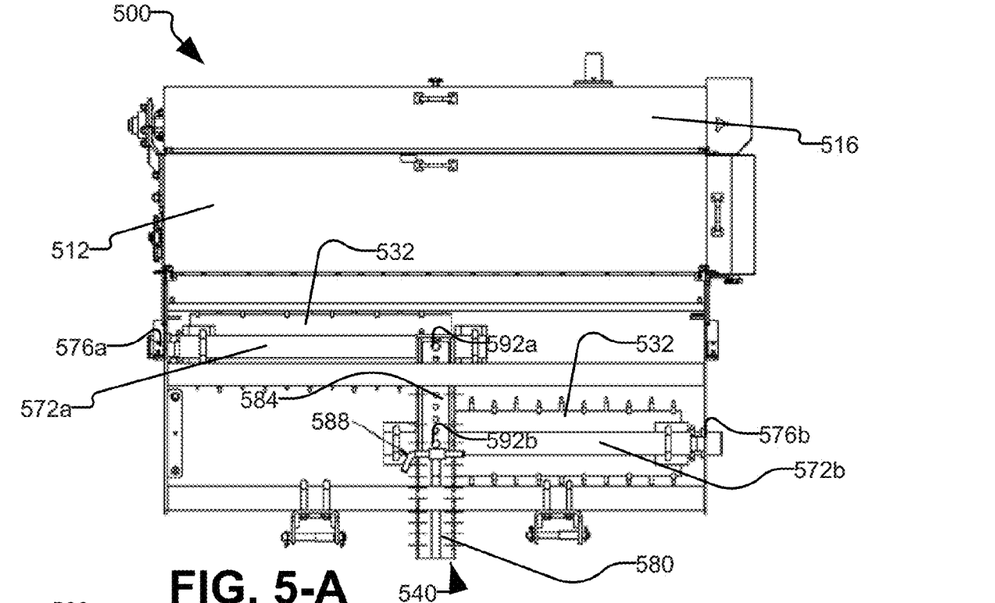

FIGS. 5-A and 5-B depict top-down views of a seeder 500. For ease of illustration, the mast plate and native seed box of the seeder 500 are not displayed in FIGS. 5-A and 5-B. The top down view more directly illustrates how rollers 532 are connected to the frame of the seeder. Specifically, the rollers 532 may be respectively mounted to bars such as a right bar 572*a* and a left bar 572*b*. In embodiments, the bars may be a three inch by three inch metal bar or a three inch square tubing, though in other embodiments the bars may be different widths or of different shapes. For example, the bars may be rectangular, circular, or some other shape, and may be either solid, hollow, or semi-hollow. In some embodiments, the right bar 572*a* and the left bar 572*b* may be offset from each other such that the left bar 572*b* is closer to the front of the seeder 500 than the right bar 572*a*. This configuration may be useful when rollers 532 are sized and configured to at least partially overlap. In some embodiments, the right bar 572*a* may be in front of the left bar 572*b*, and in other embodiments the right and left bars 572*a* and 572*b* may be lined up with one another in the front-to-back direction.

The right and left bars 572*a* and 572*b* may be coupled with the frame of the seeder 500 at frame connection points 576*a* and 576*b*, respectively. In some embodiments, the frame connection points 576*a* and 576*b* may be loose, hinged, or otherwise moveable such that the right and left bars 572*a* and 572*b* may be angled, as described in greater detail below.

The seeder 500 may further include an adjustment mechanism 540 including a stationary tray 580 with a number of different positions. The adjustment mechanism 540 may further include a studded roller slide 584. In embodiments, the stationary tray 580 may remain static with respect to the frame of the seeder 500, while the studded roller slide 584 may move with respect to the stationary tray 580 and the frame of the seeder 500. The studded roller slide 584 may be latched to a position of the stationary tray 580, for example using a pin, a latch, or some other fastener 588. In embodiments, the studded roller slide 584 may be attached to the right and left bars 572a and 572b at right and left connection points 592a and 592b.

In embodiments, the adjustment mechanism 540 may be used to adjust the angle Θ of the rollers 532 with respect to the seeder 500, as shown in FIG. 5-B. In embodiments, the fastener 588 may be removed, and the studded roller slide 584 may be moved forward with respect to the seeder 500 and the stationary tray 580. In some embodiments, the studded roller slide 584 may be moved using an adjustment lever such as adjustment lever 144 shown above (not shown here for ease of illustration). In embodiments, the adjustment lever may be coupled with the studded roller slide 584 and configured to be used by the operator to move the studded roller slide 584 with respect to the stationary tray 580.

By moving the studded roller slide 584 forward, the connection points 592a and 592b are moved forward while the frame connection points 576a and 576b remain stationary. Therefore, the rollers 532 rotate with respect to the seeder 500 by angle Θ, as shown. When the rollers 532 are rotated to a desired angle, the studded roller slide 584 may be coupled with the stationary tray 580 using the fastening 588. In embodiments, the studded roller slide 584 may be coupled with the stationary tray 580 at eight distinct positions, and angle Θ may range from 0° to 30°. In some embodiments, a seeder 500 with a lower width may be configured to have a greater maximum angle Θ. In some embodiments, the seeder 500 may have a different range of angles Θ, including a negative angle Θ. In some embodiments, the studded roller slide 584 may have a greater or lesser number of positions with respect to the stationary tray 580.

Generally, when the angle Θ is approximately equal to 0° and the rollers 532 are relatively straight with respect to the seeder 500, as shown for example in FIG. 5-A, the spike roller pins (not labeled for simplicity of FIGS. 5-A and 5-B) may penetrate soil in a straight pushing action, thereby creating holes for seeds to be deposited into, and aerating the turf, but otherwise causing relatively little disturbance to the turf. However, when the angle Θ is not equal to 0°, for example as shown in FIG. 5-B, the spike roller pins may cause a more aggressive tearing action to the turf, thereby disturbing the turf more. In embodiments, a greater angle Θ will cause more disturbance to the turf, and so a maximum angle Θ may be desirable for severe turf conditions.

Figure 6:
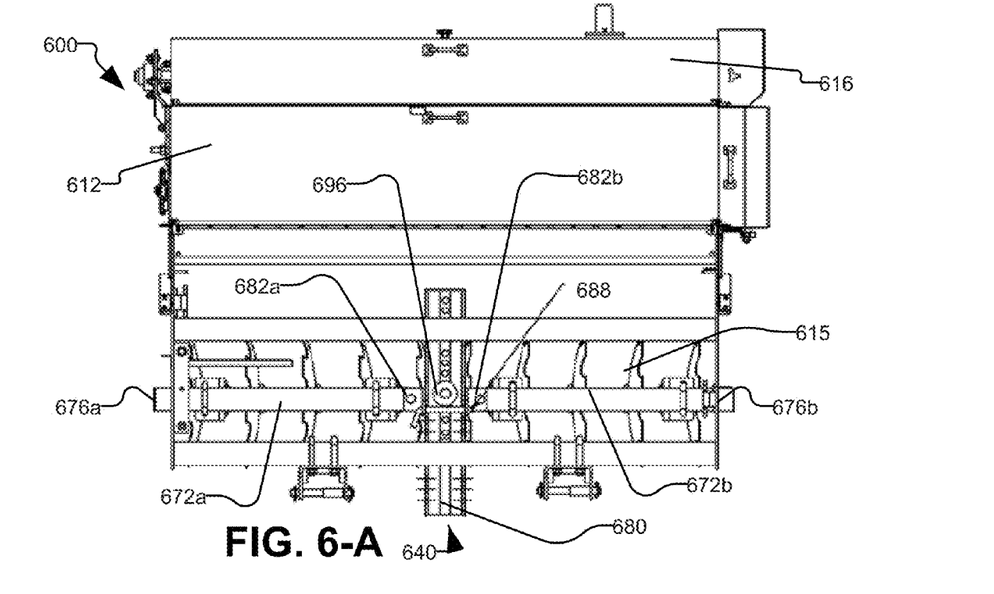

FIGS. 6-A and 6-B show a top-down view of a seeder 600. For ease of illustration, the mast plate and native seed box of the seeder 600 are not displayed in FIGS. 6-A and 6-B. As shown, seeder 600 utilizes the disc blade assembly with the gang of disc blades 615, as discussed above with respect to FIG. 2 and elsewhere. As can be shown, the gang of disc blades 615 is coupled with a right bar 672a and a left bar 672b. The right bar and left bar 672a and 672b are moveably coupled with the frame of the seeder 600 at frame connection points 676a and 676b, which may be hinged or otherwise moveably coupled with to the frame of the seeder 600.

The right and left bars 672a and 672b are coupled at connection points 682a and 682b with a moveable connector 696, which in turn is coupled with the stationary tray 680. In embodiments, the right and left bars 672a and 672b are relatively even with one another with respect to the front of the seeder 600, as shown in FIG. 6-A. However, in some embodiments the right and left bars 672a and 672b may be offset with respect to one another.

In embodiments, the moveable connector 696 may be moved with respect to the stationary tray 680 using an adjustment lever such as adjustment lever 144 shown above (not shown here for ease of illustration), which may result in the gang of disc blades 615 rotating by angle È, for example as shown in FIG. 6-B. This rotation may occur because the connection points 682a and 682b may move toward the rear of the seeder 600 if the moveable connector 696 is moved toward the rear of the seeder, while the frame connection points 676a and 676b remain stationary.

In some embodiments, the angle È may be between 0° and 25°, though in other embodiments the angle È may be greater or lesser, for example being a negative angle. In some embodiments, the moveable connector 696 may have four distinct positions with respect to the stationary tray 680, while in other embodiments may have more or less positions.

In some embodiments the seeder 600 using the gang of disc blades 615 may be used to prepare a seedbed without the need for a separate disc blade or tillage tool used ahead of time. When the gang of disc blades 615 are relatively straight, for example as shown in FIG. 6-A, the seeder 600 may create a relatively small amount of soil disturbance. However, when the gang of disc blades 615 are angled, for example as shown in FIG. 6-B, then the disc blades may create a very large amount of soil disturbance.

Even though the studded roller slide 584 of FIGS. 5-A and 5-B is different from the moveable connector 696 of FIGS. 6-A and 6-B, in some embodiments the seeder 500 may use the moveable connector 696, for example if the right and left bars 572a and 572b are relatively even with one another with respect to the front of the seeder 500. Similarly, the seeder 600 may use the studded roller slide 584 of seeder 500, for example if the right and left bars 672a and 672b are offset with respect to one another.

Figure 7:
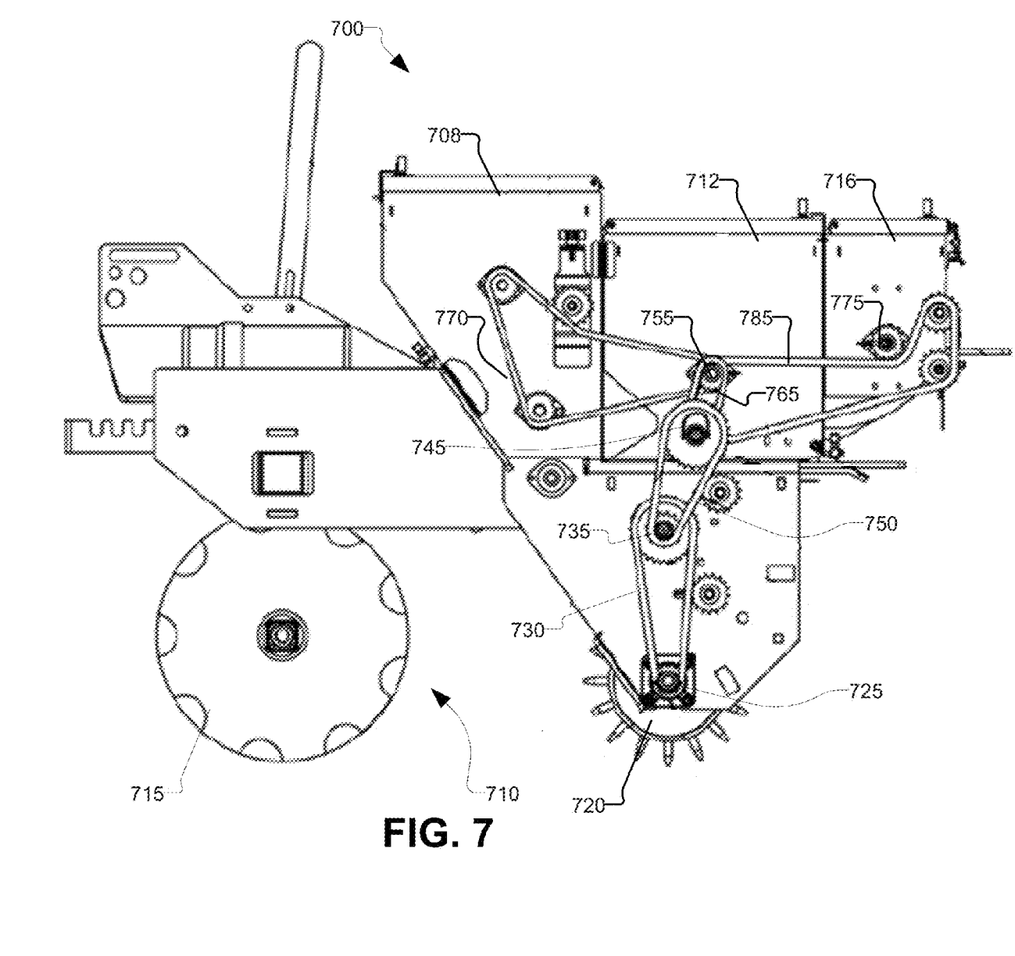
FIG. 7 is a side view of a seeder with the disc blade assembly and showing the various mechanisms used to control seeding from the different seed boxes, in accordance with various embodiments.

In embodiments, one or more of the native, primary, and legume seed boxes may be separately activated. FIG. 7 depicts an example of a seeder 700 showing one possible configuration for the various disconnects that can be used to power one or more of the native seed box 708, the primary seed box 712, and/or the legume seed box 716. In this embodiment, seeder 700 includes a disc blade assembly 710 comprising a gang of disc blades 715. In other embodiments, the disconnect system may be similarly used in a seeder containing a roller assembly, such as roller assembly 104 discussed above. For clarity of illustration, several elements of the seeder 700 are unlabeled, but seeder 700 may contain all or some of the elements discussed above in FIGS. 1-6.

As discussed above, the seeder 700 may be powered by the rotation of the roller 720 as the seeder 700 is pulled behind a tractor or some other vehicle. The seeder 700 may further include a main disconnect 725. In embodiments, the main disconnect 725 may include an axle and a gear such that when the axle rotates, the gear does not rotate if the main disconnect 725 is inoperative. For example, the axle of the main disconnect 725 may be the axle of the roller 720. However, the main disconnect 725 may be made operative by coupling the axle of the roller 720 with the gear of the main disconnect 725. This coupling may occur through insertion of a fastener. In embodiments, the fastener may be a cotter pin, a klik pin, a ball-detent pin, a safety pin, or some other type of pin or fastener. By coupling the axle of the roller 720 with the gear of the main disconnect 725, the rotation of the main disconnect 725 may be tied to the roller 720 such that the gear of the main disconnect 725 rotates when the roller 720 rotates. In embodiments, the "gear" described above with respect to the main disconnect 725 may be a sprocket used to drive a chain and/or a gear used to drive another gear. Throughout the rest of this disclosure, the term "gear" will be used with respect to disconnects, but it may be understood that the term may encompass one or both of a sprocket and/or gear.

In embodiments, when the main disconnect 725 is operative, that is tied to the rotation of the roller 720, rotation of the main disconnect may cause the main chain 730 to rotate. The main chain 730 may be coupled with gears 735 such that when main disconnect 725 rotates, the main chain 730 may cause the gears 735 to rotate. In embodiments, gears 735 may include a plurality of different gears, for example a 15/30 or a 15/40 gear such that the gears 735 may be used to translate the speed of the main chain 730 into a different speed for a different chain, for example primary chain 750. In other embodiments, the seeder 700 may have a different size of gears.

The gears 735 may in turn be coupled with the primary disconnect 745 via a primary chain 750. Similarly to the main disconnect 725, the primary disconnect 745 may contain a gear and an axle. When the gears 735 rotate, then the primary chain 750 may cause the gear of the primary disconnect 745 to rotate. If the primary disconnect 745 is operative, that is the axle of the primary disconnect 745 is coupled to the gear of the primary disconnect 745 through a fastener such as the fastener described above, then the rotation of the primary disconnect 745 may power the primary seed box 712 and cause the primary seed box 712 to disperse seed.

The primary disconnect 745 also be coupled with the native seed box disconnect 755 by a second primary chain 765. Similarly to the primary disconnect 745, the native seed box disconnect 755 may be configured to cause the native seed box 708 to disperse seed when the native seed box disconnect 755 is operative. That is, the native seed box disconnect 755 may rotate based upon rotation of the second primary chain 765 as described above with respect to the main disconnect 725 and the primary disconnect 745. Specifically, the native seed box disconnect 755 may be coupled with the native seed box 708 using a native chain 770 as shown in FIG. 7.

Similarly, the primary disconnect 745 may be coupled with a legume box disconnect 775 using a legume chain 785. When the legume box disconnect 775 is operative, then it may cause the legume box 716 to disperse seed when the legume chain 785 rotates.

In some embodiments disconnects such as the primary disconnect 745 may include a plurality of gears, and in some embodiments the gears may be coupled with one another. Therefore, when the gear of the primary disconnect 745 rotates, even if the primary disconnect 745 is inoperative, then a chain coupled with the primary disconnect 745 such as the legume chain 785 may still move. Therefore, the seeder 700 shown in FIG. 7 may be configured by an operator to use one or both of the legume seed box 716 or the native seed box 708 without use of the primary seed box 712.

The disconnect system of seeder 700 is merely one example, and different configurations and connections using a greater or lesser number of chains and/or disconnects may be used in other embodiments. In seeder 700, it will be understood that if the main disconnect 725 is inoperative, then the main chain 730 may not rotate when the roller 720 rotates, and therefore none of the other disconnects 745, 755, or 775 may rotate.

Figure 8:
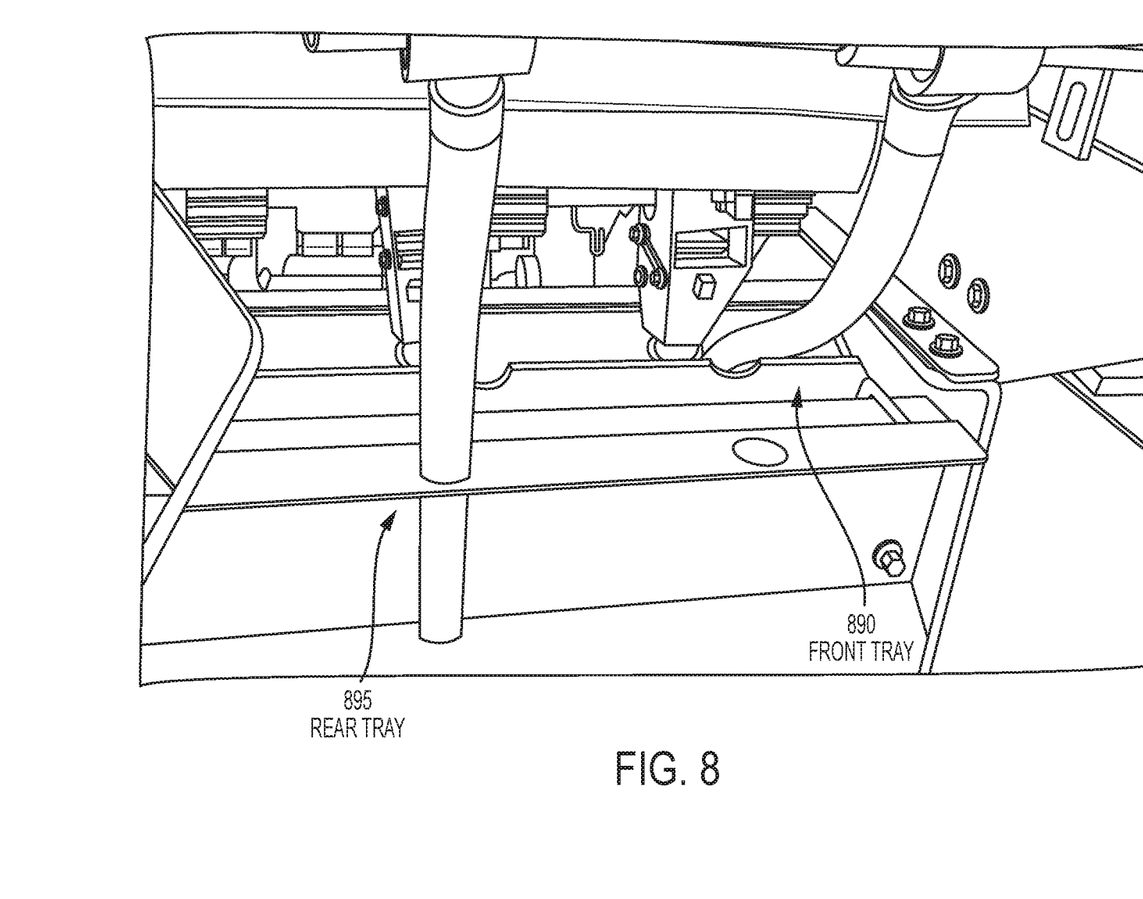
FIG. 8 is a picture of the different seed distribution options that may distribute seeds at different depths, in accordance with various embodiments.

In some embodiments, it may be desirable for a seeder to be able to plant the same kind of seed at different depths, or different kinds of seed at the same or different depths. FIG. 8 shows a configuration wherein seed can be placed into a front tray 890 and a rear tray 895 using the depicted tubes. In embodiments, the front tray 890 may be configured to disperse the seed in front of a rear roller, for example rear roller 120 shown in FIG. 1. The rear tray 895 may be configured to disperse the seed behind the rear roller and in front of the cultipacker, for example cultipacker 124 shown in FIG. 1.

The rear roller may press the seed farther into the earth if the seed is deposited from the front tray 890, while the cultipacker may allow the seed to remain at a relatively shallow depth, therefore seed from the front tray 890 may be planted by the seeder at a deeper depth than seed from the rear tray 895. In some embodiments, for example as shown in FIG. 8, the tubes may be used to deposit seed from the same source to the front and rear trays 890 and 895. In some embodiments, the tubes may be adjusted by an operator to deposit seed only into one of the front or rear trays 890 and 895. In some embodiments, the seed may come from the same source, for example the legume seed box only, while in other embodiments the seed may come from different sources, for example the primary seed box and/or the legume seed box. In some embodiments, the cultipacker may be missing from the seeder, and the seed from the rear tray 895 may stay at the level of the turf without being pressed into the turf.

In embodiments, a seeder may include a frame including a front end and a rear end, the front end of the frame configured to be coupled with a vehicle; a rear roller coupled with the frame; and a seed box coupled with the frame and configured to disperse seed, wherein the frame is configured to removably couple with an attachment including a roller assembly or a disc blade assembly. In embodiments, the seeder may further include an adjustment module configured to couple with the attachment. In embodiments, the adjustment module may be configured to angle a roller of the roller assembly or a disc blade of the disc blade assembly.

In embodiments, a seeder may include a frame coupled with a first seed box configured to distribute a first kind of seed and a second seed box configured to distribute a second kind of seed; a rear roller coupled with the frame; a front tray configured to receive the first kind of seed from the first seed box and the second kind of seed from the second seed box and further configured to disperse the first and second kinds of seed at a position in front of the rear roller. In embodiments, the seeder may further include a rear tray configured to receive the first kind of seed from the first seed box and the second kind of seed from the second seed box and further configured to disperse the first and second kinds of seed at a position behind the rear roller. In embodiments, the front tray may be configured to receive the first kind of seed from the first seed box concurrently with the rear tray being configured to receive the second kind of seed from the second seed box. In embodiments, the seeder may be configured to plant the first kind of seed at a first depth and configured to plant the second kind of seed at a second depth, wherein the first and second depths are different.

In embodiments, a seeder may include a frame coupled with a seed box, the seed box configured to disperse seed through an outlet of the frame; and a calibration tray configured to removably couple with the outlet to receive seed from the seed box, wherein the calibration tray has a width less than a width of the frame. In embodiments, the width of the calibration tray may be less than 50% of the width of the frame. In embodiments, the seed box may include a plurality of seed cups, and the width of the calibration tray may be less than or equal to a width of four seed cups.

Although the present disclosure has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present disclosure. Those with skill in the art will readily appreciate that the teachings of the present disclosure may be implemented in a wide variety of embodiments. This description is intended to be regarded as illustrative instead of restrictive.

What is claimed is:

1. An agricultural seeder comprising:
   a frame comprising:
      a front end,
      a rear end,
      a first side; and
      a second side, the front end of the frame configured for coupling with a vehicle, and the frame coupled with a seed box, wherein the seed box disperses seed through an outlet of the frame;
   a collection slot in the first side of the frame; and
   a calibration tray for determining the rate at which seed is being deposited by the seeder, the calibration tray insertable into, and removably coupled with, the collection slot in the first side of the frame and positioned to collect seed from the seed box, wherein the calibration tray has a width less than a width of the frame.

2. The seeder of claim 1, wherein the width of the calibration tray is less than 50% of the width of the frame.

3. The seeder of claim 1, wherein the seed box comprises a plurality of seed cups, and the width of the calibration tray is less than or equal to a width of four seed cups.

4. The seeder of claim 1, further comprising a rear roller coupled with the frame; wherein the frame is configured for removably and interchangeably coupling individually with each one of a plurality of attachments at an angle Θ relative to the front end of the frame.

5. The seeder of claim 4, wherein the seeder further comprises an adjustment module.

6. The seeder of claim 5, wherein the adjustment module is coupled to the plurality of attachments.

7. The seeder of claim 6, wherein the plurality of attachments comprises a roller assembly and a disc blade assembly.

8. The seeder of claim 6, wherein the adjustment module sets the angle Θ of the attachments relative to the front end of the frame.

9. The seeder of claim 1, wherein the seed box is a first seed box that distributes a first kind of seed, and the frame is further coupled with a second seed box that distributes a second kind of seed through the outlet, the seeder further comprising:
   a rear roller coupled with the frame; and
   a front tray that receives the first kind of seed from the first seed box and the second kind of seed from the second seed box, the front tray further dispersing the first and second kinds of seed at a position in front of the rear roller.

10. The seeder of claim 9, further comprising a rear tray that receives the second kind of seed from the second seed box, the rear tray further dispersing the second kind of seed at a position behind the rear roller.

11. The seeder of claim 10, wherein the front tray receives the first kind of seed from the first seed box concurrently with a time at which the rear tray receives the second kind of seed from the second seed box.

12. The seeder of claim 11, wherein the seeder plants the first kind of seed at a first depth and plants the second kind of seed at a second depth, wherein the first and second depths are different.

* * * * *